US008215541B2

(12) United States Patent
Bucher et al.

(10) Patent No.: US 8,215,541 B2
(45) Date of Patent: Jul. 10, 2012

(54) AUTOMATED PROXIMITY-RELATED NETWORK AUTHORIZATION

(75) Inventors: Timothy Bucher, Geyserville, CA (US); Mark Andrew Ross, San Carlos, CA (US); Arthur Anthonie van Hoff, Menlo Park, CA (US)

(73) Assignee: Dell Products, L.P., Round Rock, TX (US)

( * ) Notice: Subject to any disclaimer, the term of this patent is extended or adjusted under 35 U.S.C. 154(b) by 761 days.

(21) Appl. No.: 12/346,352

(22) Filed: Dec. 30, 2008

(65) Prior Publication Data

US 2010/0163613 A1    Jul. 1, 2010

(51) Int. Cl.
*G06F 17/00* (2006.01)
(52) U.S. Cl. .............. 235/375; 235/462.13; 235/462.44; 235/472.01
(58) Field of Classification Search ............. 235/462.13, 235/462.44, 462.45, 472.01, 472.02, 472.03, 235/375
See application file for complete search history.

(56) References Cited

U.S. PATENT DOCUMENTS

| 7,946,493 B2* | 5/2011 | Havens et al. ........... 235/462.42 |
| 2010/0048242 A1* | 2/2010 | Rhoads et al. ............. 455/556.1 |

* cited by examiner

*Primary Examiner* — Karl D Frech
(74) *Attorney, Agent, or Firm* — Workman Nydegger

(57) ABSTRACT

Systems and methods for inputting configuration and network authorization information into a media device such that the media device may interface with media content providers and wireless networks. A service center collects configuration and network authorization information for a media device and generates a configuration module based thereon. The configuration module is then converted into the form of barcode which is provided to a media device capable of reading a barcode. The media device decodes the barcode and extracts the configuration module. The extracted configuration module is installed on the media device, configuring the device to access predetermined media content providers and/or wireless networks.

21 Claims, 8 Drawing Sheets

AUTOMATED PROXIMITY-RELATED NETWORK AUTHORIZATION

CROSS-REFERENCE TO RELATED APPLICATIONS

Not Applicable.

BACKGROUND OF THE INVENTION

1. The Field of the Invention

The present invention relates generally to media devices. More specifically, embodiments of the present invention relate to methods and systems for inputting configuration and authorization information into a media device such that the media device may access media content and/or wireless networks.

2. The Relevant Technology

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One of the advantages afforded by technological improvements is the ability to distribute to digital media. Digital media (e.g., music, video, Internet data, sports data, news data, weather data, etc.) can be distributed to media devices via various networks including the Internet as well as wireless communication, such as satellite radio, WiFi, cellular networks, and the like. Given the diversity of media devices and media content, many different types of devices have been developed to enjoy the growing availability of digital media, including MP3 players, portable CD players, portable DVD players, notebook computers, cellular telephones, personal digital assistants (PDAs), are examples of such devices. Digital media can also be enjoyed on other non-portable devices as well such as on desk top computers.

Digital media can be distributed to portable media devices via a cable connection or wireless communication, such as satellite radio, WiFi, cellular networks, and the like. A variety of media content providers are available for distributing music, video, Internet data, sports, news, weather, and the like, to portable media devices.

Oftentimes, the media content providers require user authentication before they will provide any content or services to portable and non-portable media devices. Consequently, the portable and non-portable media devices must contact each individual media content provider that requires authentication and satisfy any authentication requirements prior to being able to access desired content or services.

Additionally, since some media devices are portable, users may take a device to different physical locations, such as a school, a library, a coffee shop, a hotel, a friend's house, etc. While traveling with a media device, a user may desire to acquire media content for the device. Typically, media content providers are accessible by connecting the media device to an available network. However, a media device must be properly configured to access a particular network. Public and private locations having available networks oftentimes have different requirements and procedures for accessing that particular location's network. In general, a web browser interface is required to perform the necessary steps to gain access to an available network. Media devices without web browser capabilities are therefore unable to access some networks.

The subject matter claimed herein is not limited to embodiments that solve any disadvantages or that operate only in environments such as those described above. Rather, this background is only provided to illustrate one exemplary technology area where some embodiments described herein may be practiced

BRIEF SUMMARY OF THE INVENTION

These and other limitations are overcome by embodiments of the invention which relate to methods and systems for inputting configuration and authorization information into a media device such that the media device may access media content and/or wireless networks. This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

An embodiment disclosed herein relates to methods and systems for inputting configuration and authorization information into a media device such that the media device may access media content and/or wireless networks. The method may be practiced in a system including a media device that is capable of receiving content or services from media content providers via a network connection. A service center collects configuration and network authorization information for a media device and generates configuration information based thereon. The configuration information is then converted into the form of a barcode which is provided to a media device capable of reading the barcode. In one embodiment, the media device includes a built-in camera that is configured to read a barcode displayed on the screen of a computer. The media device decodes the barcode and extracts the configuration module from the barcode. The extracted configuration module can then be installed on the media device, configuring the device to access predetermined media content providers and/or wireless networks. This allows configuration information to be generated and delivered to a device such that the device can then access the relevant network. The configuration information in the form of a barcode may also be offered by a service provider and contain the particular configuration and authorization parameters to access that service provider's services and/or content.

Additional features and advantages will be set forth in the description which follows, and in part will be obvious from the description, or may be learned by the practice of the teaching herein. The features and advantages of the teaching herein may be realized and obtained by means of the instruments and combinations particularly pointed out in the appended claims. These and other features will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
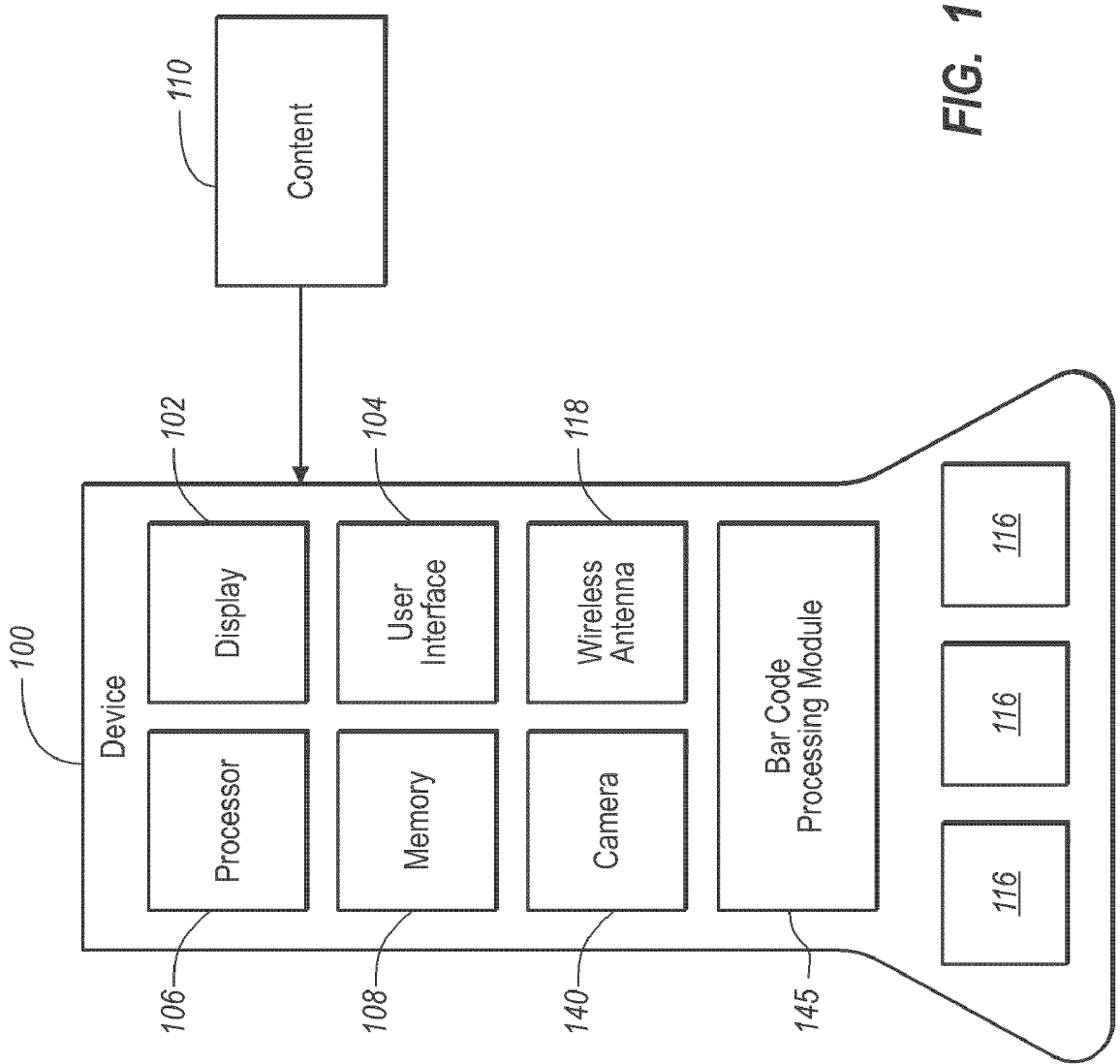
FIG. 1 illustrates a block diagram of a portable media device.

In the following detailed description, reference is made to the accompanying drawings which form a part hereof, and in which are shown by way of illustration specific embodiments in which the invention may be practiced. It is to be understood that other embodiments may be utilized and structural changes may be made without departing from the scope of the present invention For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

In order to gain access to media content, a media device typically must be configured to interface with media content providers and wireless network providers. Typically, the media content providers require user authentication before they will provide any content or services to media devices. Consequently, the media devices must interface with each individual media content provider that requires authentication and satisfy any authentication requirements prior to being able to access desired content or services. Configuring a device to interface with multiple media content providers can be problematic and time consuming, especially given the limited user interface capabilities associated with many media devices. As the trend in portable media devices is to make them pocketsize or smaller, the area available on the device for a user interface is limited. For example, many media devices do not have a full keyboard available for entering the information necessary to interface with a media content provider.

Additionally, media content providers are generally only accessible to a device via a network, such as the Internet, which is often accessed via some type of local network. Many media devices come equipped with wireless capabilities to access a network, but, typically, must be configured to gain authorization to access a particular wireless network. However, most public and private networks require that a user accept certain terms and conditions of use and some require payment before allowing a user to access the network. Most of the applications used by networks to allow a user access are configured to interface with the user via a web browser. Since many media devices do not have a web browser capabilities, it may not be possible to initially configure the device to access a network from the network itself because without a web browser, a user cannot fill out the required forms, accept the terms and conditions of use, provide payment information, etc.

Embodiments of the invention relate to systems and methods for inputting configuration and network authorization information into a media device such that the media device may interface with media content providers and wireless networks. A service center collects configuration and network authorization information for a media device and generates a configuration module based thereon. The configuration module may contain the device parameters and settings necessary to access local networks such as a wireless network, media content sources, or any combination thereof The configuration module is then converted into the form of barcode or other form which is provided to a media device capable of reading a barcode. The media device decodes the barcode and extracts the configuration information. The extracted configuration information is installed on the media device, configuring the device to access predetermined media content providers and/or wireless networks.

In addition, the service center interfaces with media content providers and network access providers to determine the admission requirements of each provider. The service center allows a device user to perform the necessary access requirements such that a configuration module may be generated and provided to the media device allowing access to the networks and media content providers.

When interfacing with the service center, a media device may create and register a new configuration module, access an existing configuration module, or acquire configuration data without registering a configuration module. A media device may have several different configuration modules at a given time. In other words, additional configurations modules may be added to a media device to supplement the device capabilities. Configuration modules may be associated with a particular device using a unique device serial number provided by the manufacturer. Registering the configuration module with the service center causes the service center to store the particular configuration associated with a certain device, thereby allowing a user to manage the destination networks and media content providers associated therewith. Once a configuration module is registered with the service center, a user may choose to associate that configuration with multiple devices. For example, when a user buys another media device or chooses to upgrade a media device to a newer model, the new device may be associated with the existing configuration module so that the user can use the new device at all the locations designated in the existing configuration. Further, a user may also add other users to an existing configuration module. This feature allows a user to share her configuration module with family members and friends who may wish to access the same media content.

In addition, the service center may also determine when changes are made to the admission requirements and may then ensure that the configuration module is changed or updated to reflect these changes. Advantageously, this ensures that the media device is at least partially immune to changes to authentication.

Though described herein in connection with a mobile electronic device in the form of a personal music device, one of skill in the art, with the benefit of the present disclosure, will appreciate that embodiments of the invention can be practiced in conjunction with other devices that may include, but are not limited to, personal digital assistants, cellular telephones, personal audio devices, satellite radios, and the like or any combination thereof Accordingly, the following discussion should not be construed to limit the present invention in any way.

One embodiment of the present invention includes a mobile electronic device implemented as an 802.11-enabled personal audio/video device that can receive content over a wireless network, one example of which is a "WiFi" network. The content can be delivered by various content providers. Embodiments of the invention can also dock with another device such as a computer for various reasons (e.g., altering stored content, synchronization, backup) and perform in a similar manner over the computer's connection.

FIG. 1, for example, illustrates one embodiment of a mobile electronic device ("device") 100 that can be utilized in connection with one or more embodiments of the present invention. FIG. 1 illustrates an embodiment of a device that can be configured to receive content including digital media from one or more sources. Examples of the device 100 may include, by way of example, a satellite radio device, a portable audio player (MP3 player, iPod, etc.), a portable DVD or CD player, a personal computer, a laptop computer, a cellular telephone, a personal digital assistant (PDA), and the like or any combination thereof Embodiments of the invention generally refer to portable media devices, but one of skill in the art can appreciate that embodiments of the invention can be used with other devices able to receive and render media content.

Typically, the device 100 includes a display 102 that can convey information to the user of the device. For example, when the device 100 renders digital audio data, the display 102 may indicate the song title, the artist, the album title, the track number, the length of the track, and the like or any combination thereof In one embodiment, the display 102 is an LCD panel which has optical sensors built into each pixel of the display. The embedded optical sensors allow the display 102 to function as a touch screen and/or a scanner for scanning in barcode images, as discussed in detail herein. The device 100 also includes a user interface 104 (such as control buttons, touch screen, capacitive input, etc.) or other means of providing input to the device 100. The user interface 104, by way of example, enables a user to navigate and activate the digital media and other content that is stored on the memory 108 of the device 100 or to navigate and perform any digital media or content that is received from an external source. The user interface 104 may enable a user to switch to another channel, such as in satellite radio, or otherwise select media content.

The content 110 represents different types of media including digital media that may be received by the device 100. Examples of the content 110 include, but are not limited to, digital music, talk audio data, television data, movie data, podcasts, sports data, weather data, news data, Internet data, and the like or any combination thereof The content 110 can be either digital or analog in nature.

The memory 108 of the device can be used to store content or other user and/or device data. The memory 108, for example, may store digital music and/or video, graphics, play lists, user preferences, device settings, and the like or any combination thereof.

The camera 140 may be used in this application to capture images of a barcode that can be processed with the barcode processing module 145 to extract the configuration module information, as will be described in detail herein. Of course, the camera 140 may also be used to take unrelated photographs which may be stored in the memory 108. Alternatively, the barcode processing module 145 may include a built-in barcode reader that is configured to scan and process the barcode directly. A barcode may also be scanned directly by the display 102 in an embodiment in which the display is an LCD display with embedded optical sensors. Examples of barcode readers are given by way of illustration only and not to limit the scope of the invention, as virtually any means for capturing a barcode may be used to implement principles of the present invention.

The device 100 may be a network connectable device. Thus, the device 100 may include a connection for accessing one or more wired and/or wireless networks. The device, for example, may include the ability to access multiple types of wireless networks, including 802.xx related networks (e.g., WiFi) and others using the antenna 118, which may be part of the connection. The device 100, in addition to 802.11 type networks, may have access to other radio frequency networks such as a cellular network, a satellite network, and/or terrestrial RF networks (e.g., WiMAX, AM, FM, DAB (digital audio broadcasting)). Further, the device 100 may have access to one or more hardwired networks.

The device 100, for example, may be able to access the Internet through a wireless access point (e.g., a WiFi hotspot). Once connected to the Internet, the device 100 may interact with multiple content providers. In one embodiment, the device 100 may access satellite broadcast content over the Internet rather than over a satellite network. The device 100 may also be able to access terrestrial radio broadcasts (digital radio, FM, AM, and the like). Further, the device 100 may also be able to receive and provide other media content, such as World Wide Web content, television content, video content and the like or any combination thereof.

In one example, the device 100 may be a wireless-enabled personal music device that can access media content through the Internet using wireless network connections including WiFi wireless connections. The user of the device 100 can access media content whenever the device 100 is within range of a wireless access point or whenever access to a network is present.

The device 100 further includes various modules 116. The modules 116 represent the software or computer executable instructions that, when processed, cause the device to access networks, download content, manage content, provide and control the user interface including the display 102, record media content, and the like or any combination thereof The memory 108 may store media content from the user's library on another device or may store a library of media content that has been recorded or purchased over the wireless connection or that has been shared with the device 100 from another user.

Figure 2:
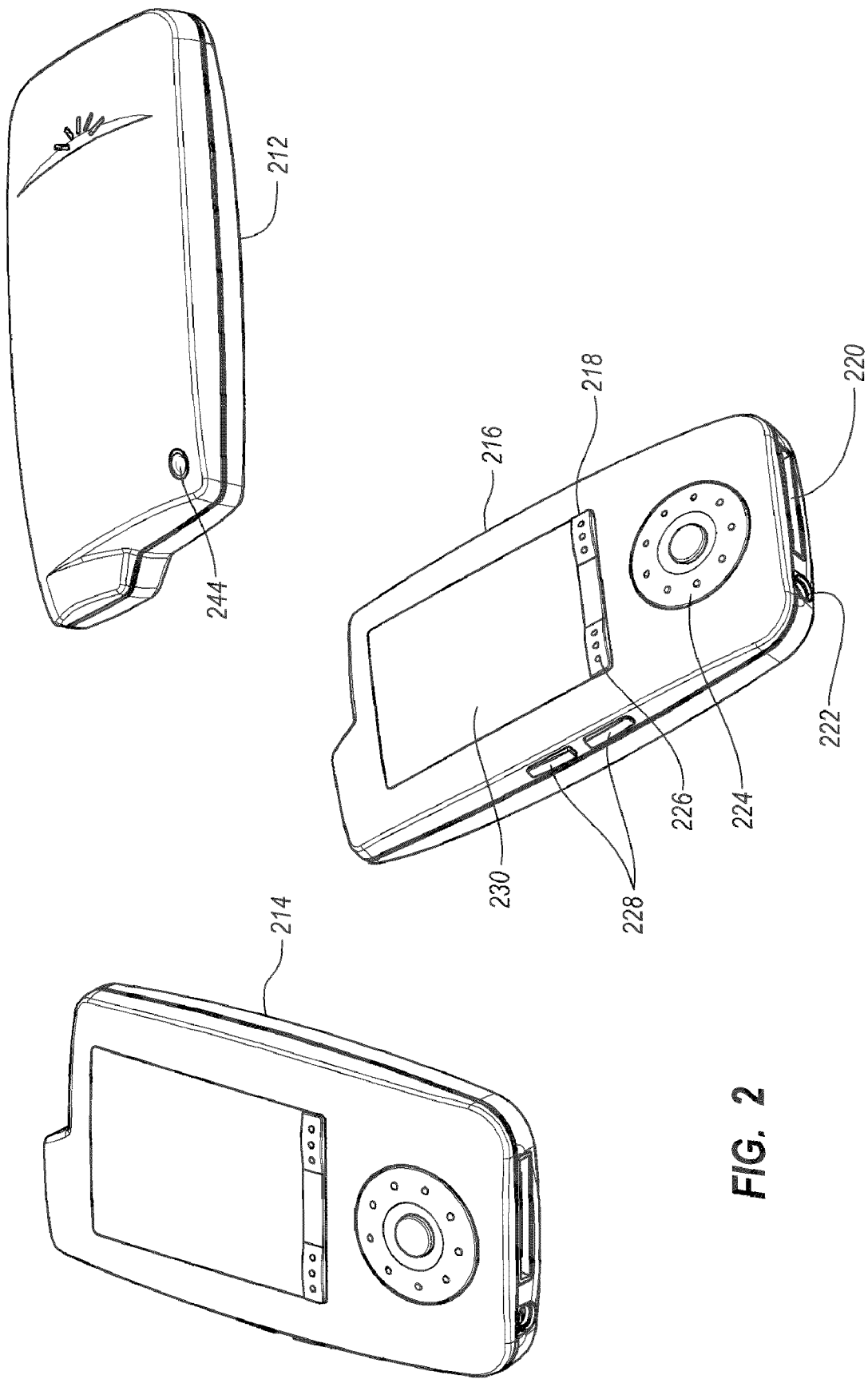
FIG. 2 illustrates perspective front and rear views of an example media device that can be used in conjunction with the features of the present invention.

FIG. 2 illustrates perspective views of an example media device with display and navigation mechanisms that can be used in conjunction with the features of the present invention. FIG. 2 illustrates one view of the rear portion 212 of the device and two views of the front portion 214 and 216. In this example, the device is a hand-held device, although larger devices can also be used. The device includes a display screen 230 having various display methods. A user can interact with the device using a touchpad 224, electromechanical keys on a keypad, such as arrow keys and alphanumeric keys, soft keys 226 on display screen 230, a navigation wheel, other device buttons 228, a remote control device associated with the device, voice commands, or by moving the communication device in a particular way. The viewfinder 244 of an internal camera may be used to capture images. The device may also include port 222 for connecting audio headgear and port 220 for connecting the device to a docking station or connector for charging the device. Of course, the device can include any of a variety of configurations and designs that are contemplated within the scope of the present invention.

Figure 3:
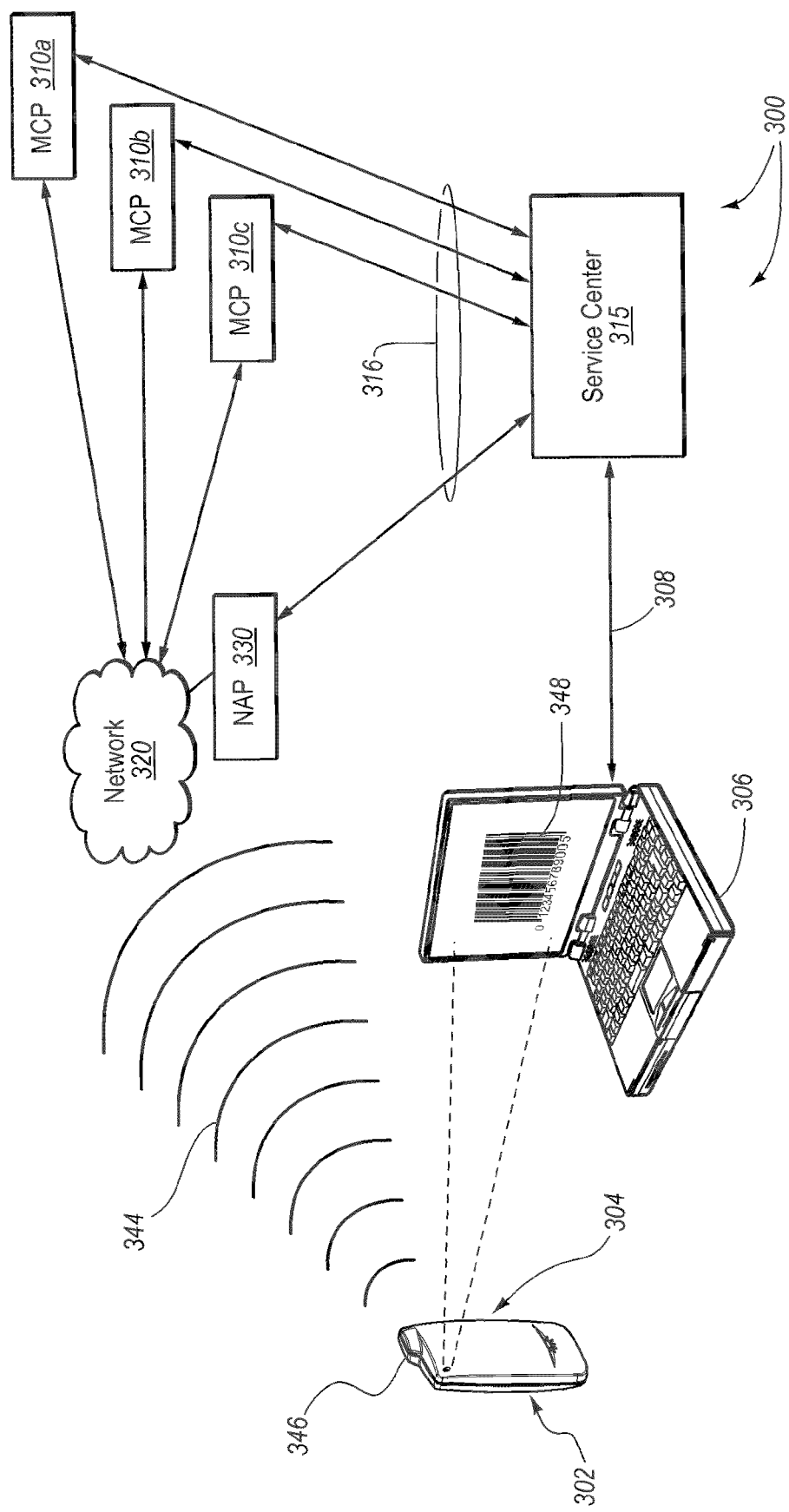
FIG. 3 illustrates an example environment in which a media device may be configured via a barcode to access one more destination networks and/or one or more media content providers.

FIG. 3 illustrates one example of an environment in which a configuration module may be input into a media device 302, such that the media device 302 may interface with one or more media content providers via one or more wireless networks. FIG. 3 includes a system 300 for enabling a media device 302 to create and enter a configuration module such that the media device 302 may interface with multiple media content providers 310a, 310b and 310c via one or more wireless networks, illustrated in FIG. 3 as network 320. For the sake of illustration, FIG. 3 illustrates three media content providers 310 and only one wireless communication path 344; however the media device 302 may be configured to interface with any number of media content providers via any number of different wireless networks.

The system 300 includes a service center 315, which may be executing on server computer(s), for creating a configuration module. In this example, an Internet-accessible laptop 306 provides a user interface between the service center 315 and the media device 302. Via the laptop 306, a user may transmit information to the service center 315 including, but not limited to, device identification (device serial number and/or model number), network identification(s), media content provider(s), authentication information, and the like. As described in detail herein, the service center 315 interfaces with the media device 302, the media content providers 310 and the network access provider 330 to satisfy any requirements necessary to access the network and/or media content with the device. Once the necessary requirements have been satisfied, the service center 315 generates a configuration module based on the received information and displays the configuration module to the user on the screen of the laptop 306 in the form of a barcode 348 to be input to the media device 302. The configuration module in the form of a barcode may contain the device settings and parameters necessary to access both the network 320 and the media content providers 310.

The media device 302 may include, for example, any of the devices described in reference to FIG. 1. The internal camera in the media device 302 captures the image of the barcode 348 on the laptop display through the viewfinder 304. Alternatively, the media device may include a built-in barcode scanner to capture the barcode. Also, the barcode may be captured directly from the display in an embodiment in which the display is an LCD panel with optical sensors embedded into each pixel of the display. The media device 302 then processes the barcode image and extracts the configuration module which allows the device to access the media content providers 310 and/or the wireless network 320.

The media content providers 310 may be representative of media sources providing digital media that may be received by the devices 302. Typically, a media device must be connected to a network to access the media content providers 310. The media content providers 310 may be sources through which a user may obtain music, Internet data, video, podcasts, text data, and the like or any combination thereof Exemplary media content providers 310 may include, by way of example, satellite sources including digital radio and video, terrestrial sources, music downloads services, peer to peer networks, and the like or any combination thereof The media content providers 310 may include free services that may be accessed free of charge. Alternatively, the media content providers 310 may include pay services that may only be accessed by clients who are billed a predetermined amount, for example, a monthly charge, or a charge that is based on volume of usage. Furthermore, the media content providers 310 may either provide open access to the public, or may require user authentication. As will be appreciated, for those media content providers that require user authentication, no content or services will be provided to a device 310 that does not provide the proper authentication.

A network access provider 330 refers to a network provider of any network that a user may desire to access with media device 302. Since the media device 302 may be portable, a user may want to use the device to access media content providers 310 from different physical locations, such as a coffee shop, a school, a place of employment, a library, a friend's house, a hotel, etc. A network access provider refers to the network service provider of the particular location in which the media device 302 is used to access the media content providers 310. For example, if a user wanted to access media content providers 310 while visiting the home of a friend who has access to the Internet through a particular Internet service provider, then the destination network provider is the particular Internet service provider subscribed to by the friend. Typically, the service center 315 communicates with a network access provider 330 via the network provider's website.

A network access provider 330 may provide access to any network that is compatible with the devices 302 or the media content providers 310 and may include, by way of example, satellite networks, 802.11 networks, personal computer networks (e.g., LAN, WAN), wireless networks (e.g., Bluetooth, WiFi), cellular networks, telephony networks (e.g., landline or PSTN), data networks, the Internet, and the like or any combination thereof.

The service center 315 receives one or more data streams 308 from the media device 302, and likewise receives one or more data streams 316 from one or more of the media content providers 310 and/or network access provider 330. Exemplary data streams 308 and 316 include, by way of example, wired and wireless computer networks (LAN, WAN, Internet, WiFi, WiMax, EVDO, Edge Networks, GPRS, and the like), satellite signals, terrestrial signals, and the like or any other reasonable data stream.

Although illustrated as a single entity, the service center 315 can be implemented in a distributed computing environment where tasks are performed by local and remote processing devices that are linked (either by hardwired links, wireless links, or by a combination of hardwired and wireless links) through a communications network.

Figure 4:
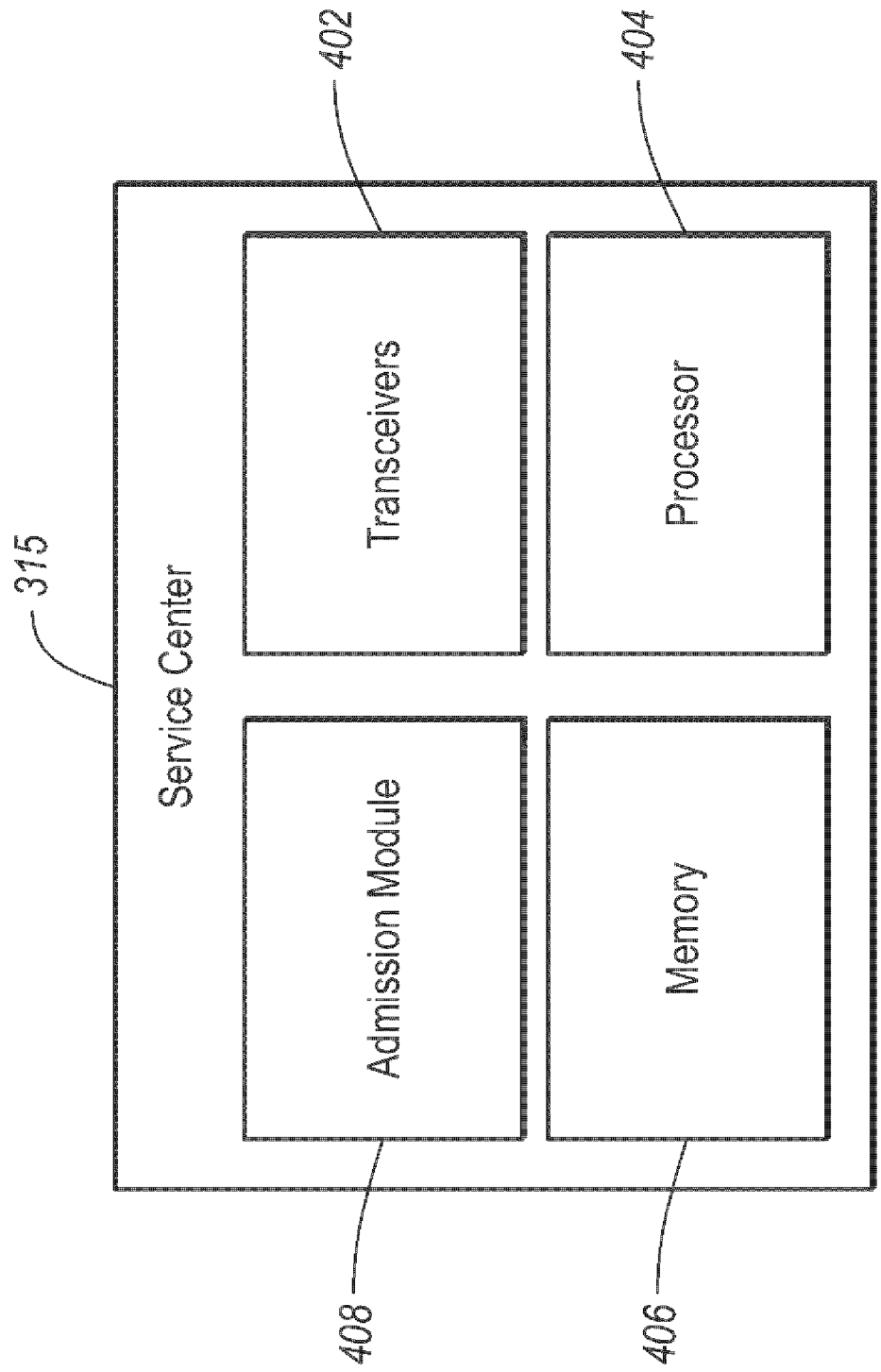
FIG. 4 illustrates a schematic drawing of an embodiment of the service center of FIG. 3.

Referring now to FIG. 4, a more detailed depiction is provided of the service center 315. The service center 315 may include one or more transceivers 402 for transferring data between itself and one or more portable media devices and also between itself and one or more media content providers and or one or more network access providers. The transceivers 402 may include both wired and wireless transceivers for communicating with any of the network access providers 330, media devices and media content providers 310. The service center 315 may further include one or more memory modules 406 for storing data received from the devices, the network access providers and from the media content providers. For instance, the memory 406 may include one or more mapping tables including information about the media devices, network access providers and/or media content providers, such as the requirements necessary to access a particular network with a device. The service center 315 may also include a processor 404 configured to provide general purpose processing for the various modules of the service center as circumstances warrant.

As further illustrated, in some embodiments the service center 315 may also include an admission module 408. The admission module 408 may be configured to ensure that a media device is properly configured such that it may be able to gain access to a media content provider via a particular network. For example, admission module 408 may communicate with the network access providers and media content providers to determine what information is needed for admission to a network and to download content. The admission module 408 interfaces with the user to satisfy the necessary admission requirements by requesting the information from the user and providing it to the requesting parties as will be described in more detail to follow. The network admission module 408 may be comprised of software, hardware, or any combination of software and hardware as circumstances warrant.

Figure 5:
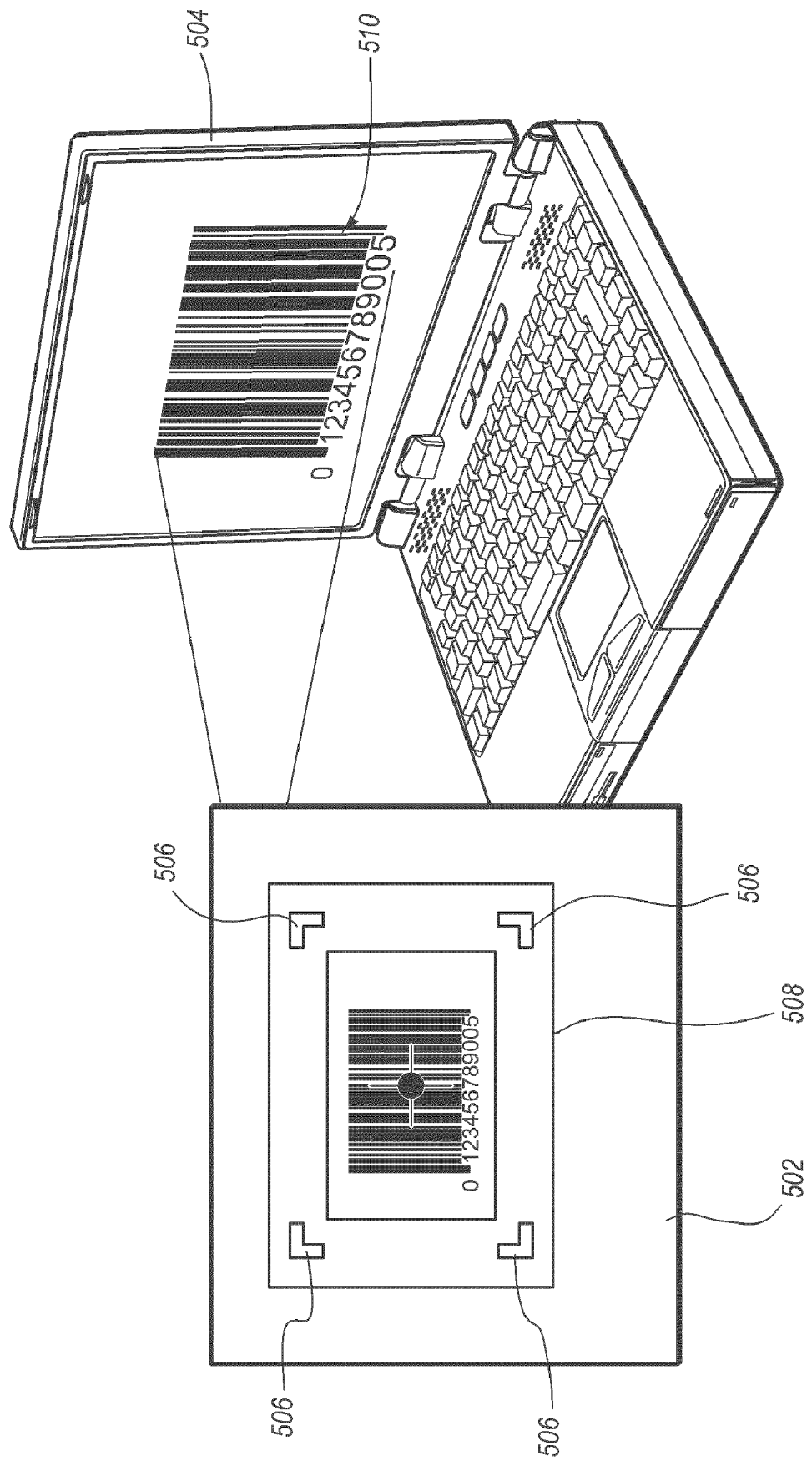
FIG. 5 illustrates an example environment in which a media device may be used to capture an electronic barcode.

FIG. 5 illustrates an example display on a media device 502 capturing the camera image of a barcode 510 displayed on the screen of a laptop 504. In this example, the media device display 508 contains barcode guides 506 for aligning the barcode and the camera such that the camera captures the barcode image properly. A user lines up the camera viewfinder of the media device 502 so that the displayed barcode 510 fits within the four corners of the barcode guides 506 on the media device display 508 to ensure that the image captured by the device will contain a discernible barcode image.

Figure 6:
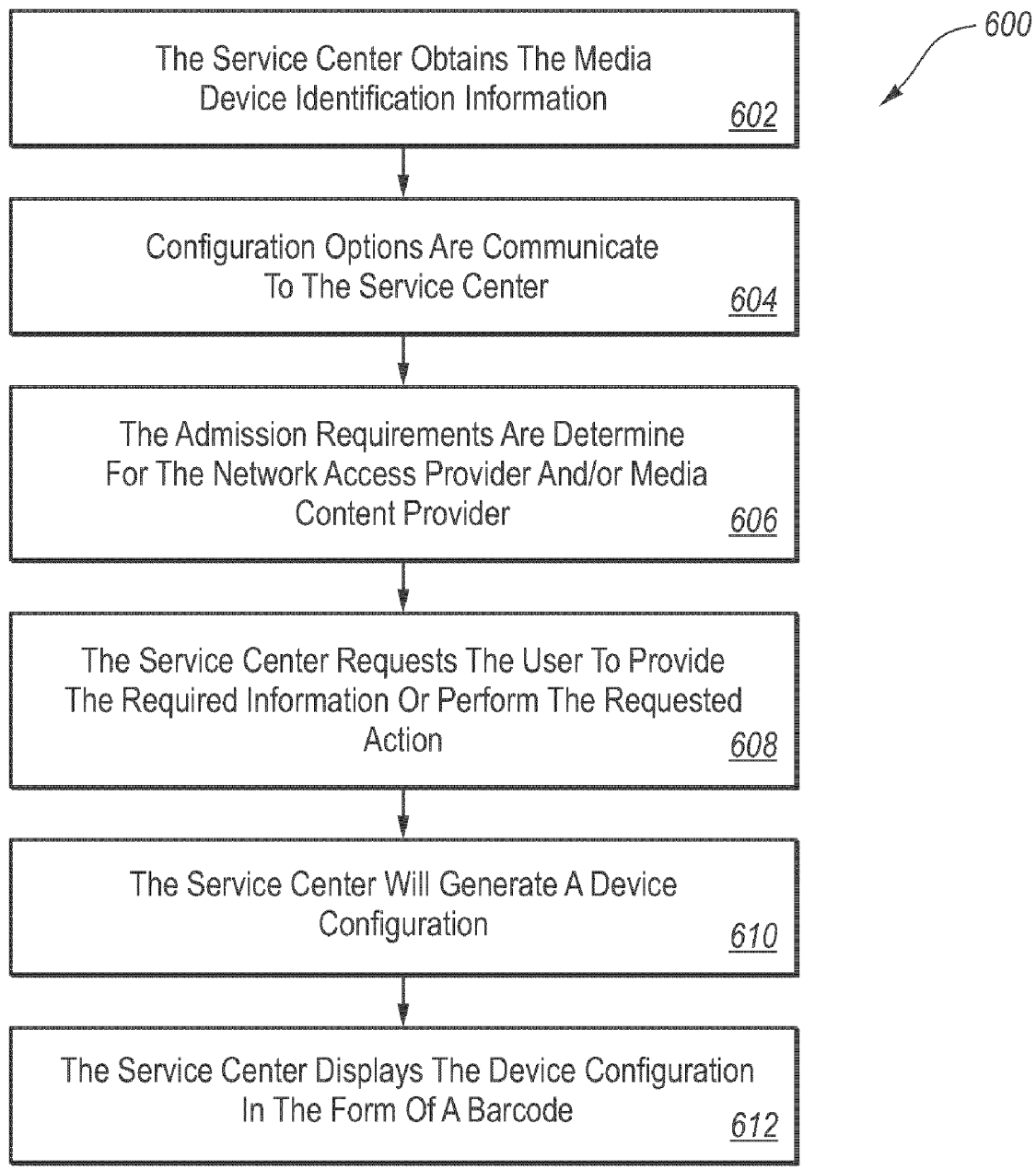
FIG. 6 illustrates a flow chart of an example method of generating a barcode containing configuration and/or authorization data for configuring a media device.

Reference is now made to FIG. 6, which illustrates an example method of generating a barcode containing configuration and/or authorization data for configuring a media device. First, the service center obtains 602 the media device identification information. In this example, the service center utilizes a web-based application such as a web-browser as a means to interface with a user. Via a laptop or a personal computer, a user may use a web browser to the access service center website. Once in communication with the service center, a user may provide registration information and/or device identification to the service center by entering a username and password, a distinctive device serial number, or any other information to identify the device. The identity of the device, including the make and model of the device, may have some relevance to the configuration module as determined by the service center. However, depending on the application, the identity and/or make and model of the device may have no relevance to the configuration module.

A user may then communicate 604 her chosen configuration options to the service center, such as the particular media content providers and networks that the media device should be configured to access. A user may chose to perform an initial configuration of the device and/or the device may be configured to interface with any number of media content providers and networks. For example, a user planning a business trip may configure the media device to be able to access media content providers from the publically available network at the hotel in which she is staying. In one embodiment, the user enters the hotel information into a form provided by the service center website. The service center then uses the hotel identification information to contact the network access provider at the hotel and obtain the network admission requirements.

During this communication the access module of the service center may receive or otherwise determine 606 the admission requirements that a particular network access provider calls for before a media device is allowed to access the wireless network. For example, the admission requirements may include, but are not limited to, accepting certain terms and conditions of use, agreeing to comply with certain licensing procedures and security regulations, providing user identification information, providing configuration module information, providing prior payment for use, and the like or any combination thereof For instance, some network access providers may only grant access to limited number of devices at a time. Some of the networks may charge for a subscription and require proof of payment, or the network provider may require that a user's addresses or home phone number be provided prior to access being granted. It will be appreciated that the admission requirements may include other conditions as circumstances warrant. Thus, the admission requirements may include any requirement that a destination network provider desires before it will grant permission to a media device to be able to access the destination network.

A similar course of action occurs regarding the media content providers' access requirements. The access module receives or otherwise determines 606 authentication information that a particular media content provider requires before a media device is allowed to access content or services from the media content provider. For example, the authentication information may include, but is not limited to, user identification information, configuration module information, prior payment information, and the like or any combination thereof For instance, some media content providers may only be able to communicate using certain types of data formats. Alternatively, some of the media content providers may be pay sites that require proof of payment or the media content providers may require that a user's addresses or home phone number be provided prior to access being granted. Again, the authentication information includes any information that a media content provider desires before it will grant permission to a device to be able to communicate with and receive content or services from the media content provider.

In some embodiments, some network access providers and/or media content providers may have a preexisting relationship with service center and thus may have admission requirement information already stored in memory, for example in a mapping table. When a network access provider or a media content provider does not have a preexisting relationship with the service center, the service center may perform an initialization routine upon connection to the provider to determine the admission requirements, which may then be stored in the memory.

The request for the admission to the network and/or media content from the media device is sent to and received by the service center. That is, the request for the admission is directed to the service center rather than proceeding directly to the network or content provider so that service may act as an interface between the media device and the provider to satisfy the admission requirements as will be explained in more detail.

In response to the request, service center, specifically the access module, may determine what information the provider requires before it will grant permission to the media device. In some embodiments, this determination is made by accessing the mapping table in memory. Alternatively, the admission information may be accessed directly from the media content provider.

Once the access module has determined the admission requirements for the destination network, the service center will ask the user to provide 608 the required information or perform the requested action. For example, the user may need to provide identification information such as an address or the like and/or accept the terms and conditions of use for the destination network. In addition, the media configuration module information may be required. If the media device has a preexisting relationship with the service center such as a registered configuration module, then this information may have been previously stored in memory and may be accessed by the service center.

Upon satisfaction of the admission requirements by the user, the service center will generate 610 a configuration module. The configuration module includes the data necessary to properly configure the media device to interface with the chosen media content providers and networks. The configuration module may be a data structure or the like that includes at least enough of the information needed for the media device to gain permission to access the media content providers and/or networks. The configuration module may also include the DNS address for the desired network. In addition, the configuration module may include instructions that configure the media device to be able to communicate properly with the media content providers.

There may be circumstances that cause one or more of the destination network providers and/or media content providers to update or change their admission requirements from time to time. For example, a provider may add a new data field to the required information or may change an existing data field. As will be appreciated, the updated or changed admission information may render a previously authenticated device unable to access the destination network.

As discussed above, the access module communicates with the destination network providers and/or media content providers and determines the admission requirements. Accordingly, the access module may also determine any updates or changes to the admission requirements when in communication with the destination network providers and/or media content providers. The new admission requirements may be stored in the memory in some embodiments.

The access module may then generate a new configuration module based on the updated or changed authentication information. The new configuration module may be provided to a media device to ensure that the device retains the ability to be access to the desired destination network provider and/or media content providers.

As will be appreciated, it may be desirable for a media device to be authenticated to more than one destination network provider and/or media content provider. Accordingly, the process described above may be repeated such that access is granted for more than one destination network provider and/or media content provider.

When prompted by the user, the service center will display 612 the generated configuration module in the form of a barcode on the user's computer screen. In one example, the barcode is displayed to the user via the service center web browser interface. Displaying the barcode allows the media device to acquire the barcode and the configuration module encoded therein.

Figure 8:
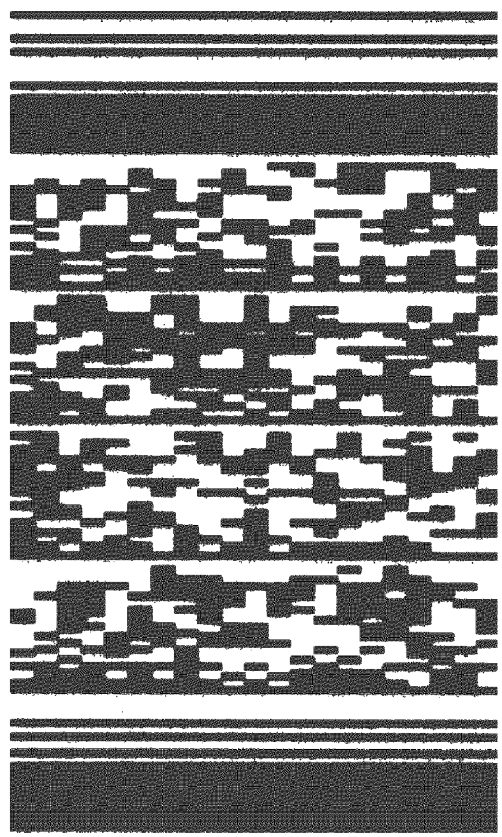
FIG. 8 illustrates an example 2-dimensional barcode that may be used in conjunction with the features of the present invention.
Figure 7:
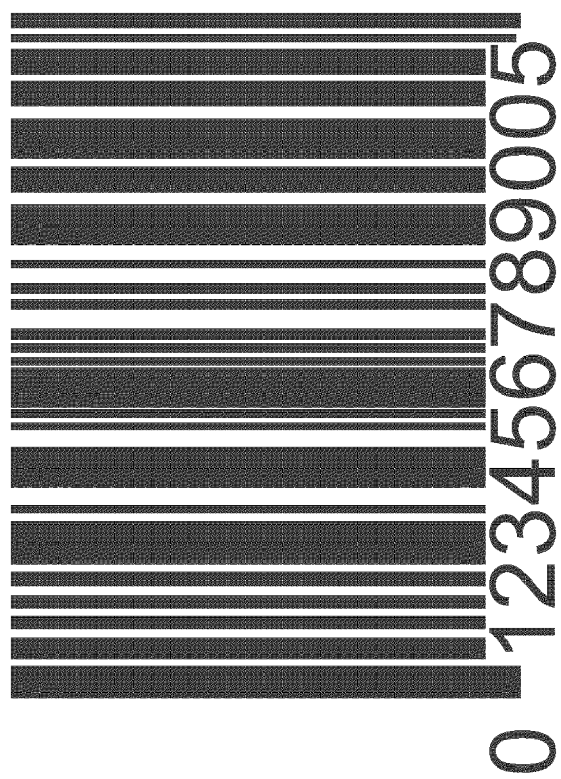
FIG. 7 illustrates an example 1-dimensional barcode that may be used in conjunction with the features of the present invention.

A barcode is an optical machine-readable representation of data. Any barcode symbology convention may be used in this application so long as it is compatible with and capable of being read by the media device camera and/or barcode reader. One-dimensional (1D) barcodes represent data in the widths and the spacings of parallel lines to encode data, an example of which is illustrated in FIG. 7. Two-dimensional (2D) barcodes, such as PDF417, MaxiCode and DataMatrix, are scanned horizontally and vertically and hold more data, an example of which is illustrated in FIG. 8. Two-dimensional barcodes, also referred to as 2D matrix codes or symbologies, may come in patterns of squares, dots, hexagons and other geometric patterns within images. The patterns (lines, squares, dots, etc.) and spacings of the barcode constitute the data encodation schema. Further, a three-dimensional (3D) barcode may also be used to implement principals of the present invention.

Figure 9:
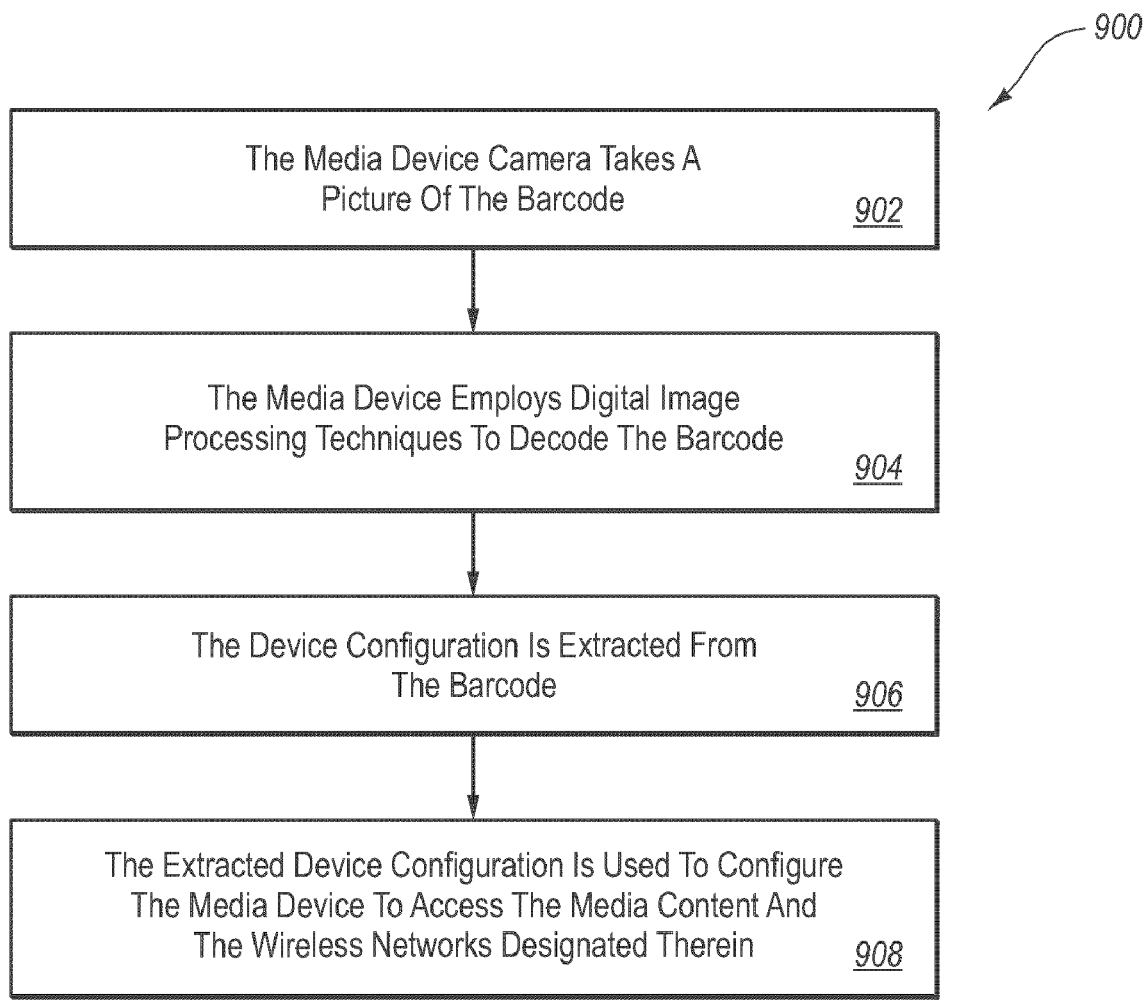
FIG. 9 illustrates a flow chart of an example method of capturing and processing a barcode image to configure a media device with the configuration module encoded therein.

Reference is now made to FIG. 9, which illustrates an example method of capturing and processing a barcode image to configure a media device with the configuration module encoded therein. Once a barcode is displayed on the screen in accordance with the method illustrated in FIG. 6, the media device reads the barcode. Any type of barcode reader may be used in this application so long as it is compatible with and capable of reading the particular barcode symbology used by the service center to generate the barcode. Types of barcode readers that may be used include, but are not limited to, pen type readers, laser scanners, charged-couple device (CCD) readers, LCD panels with embedded optical sensors, and camera based readers. For instance, CCD readers, sometimes referred to as LED scanners, measure the ambient light emitted from the barcode. CCD readers use an array of hundreds of light sensors lined up in a row in the head of the reader. Each sensor measures the intensity of the light immediately in front of it. A voltage pattern identical to the pattern in a barcode is generated in the reader by sequentially measuring the voltages across each sensor in the row. In embodiment having an LCD panel display with embedded optical sensors, a user may scan a barcode image directly with the screen of the media device. As is known in the art, optical sensors embedded into the LCD display are similar to those used in scanners, allowing for barcodes and/or other images to be scanned by the screen itself.

In the example method of FIG. 9, a camera based reader, which utilizes the media device camera, is used to capture the barcode image from the screen. The media device camera takes a picture 902 of the barcode and software and/or firmware is employed to collect the barcode data from the image. The media device software and/or firmware uses digital image processing techniques to decode 904 the barcode. The media device camera may use the same CCD technology as in a CCD barcode reader, discussed above, except that rather than having a single row of sensors, the camera has hundreds of rows of sensors arranged in a two dimensional array to generate an image.

Decoding the barcode image with the digital image processing software and/or firmware allows the configuration module to be extracted 906. The extracted configuration module may then be implemented to configure 908 the media device to access the media content and the wireless networks designated therein.

In another embodiment, the media device may be configured by capturing and processing a barcode configuration module from other sources. A barcode configuration module may be offered by sources providing services in which a media device may be utilized, such as a wireless network provider or media content provider. In this embodiment, a service provider may create a pre-configured configuration module containing the necessary parameters to access their particular services and/or content. The pre-configured configuration module can be printed or otherwise displayed in the form of a barcode. Once displayed, users may capture the barcode image with a media device. The barcode image is then processed with the digital imaging software and/or firmware and the configuration module is extracted and installed on the device, allowing the user to access the services and/or content of the provider.

For instance, a media device vendor may include a number of printed barcode configuration modules with the purchase of a media device, wherein the printed barcodes contain multiple configuration options. In another example, a coffee shop that provides wireless Internet services for customers may choose to print a barcode on the side of a coffee cup, wherein the printed barcode contains the configuration module/authorization parameters required to access the wireless network. Thus, purchasers of coffee may capture the image of the barcode on the coffee cup with a media device and gain access to the coffee shop wireless Internet.

Further, a service provider may configure the configuration module such that the authorization to access their services and/or content only lasts a discrete amount of time. A configuration module may be configured to expire after a certain amount of time has elapsed or after a certain period of inactivity has occurred.

In another embodiment, the media device may be configured to input media content in the form of a barcode. Here, media content providers may generate barcodes containing media content. Users may then acquire media content directly from the barcode image. Examples of media content that may be acquired via a barcode image include, but are not limited to, digital music, talk audio data, television data, movie data, podcasts, sports data, weather data, news data, Internet data, and the like or any combination thereof.

The information in the configuration module can also be passed to a device in other manners, including audibly. In this example, sound content may be conveyed to a media device and captured with a microphone. The sound is encoded with the information needed to authenticate and/or access a provider.

Embodiments herein may comprise a special purpose or general-purpose computer including various computer hardware. Portable media devices are examples of special purpose computers. Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for configuring a portable media device so that the portable media device can connect to a network to receive services or content from one or more service providers, the method comprising:
   capturing, with a media device, an image of a barcode that encodes configuration information for configuring the portable media device to connect to a network;
   extracting the configuration information from the barcode image; and
   configuring the portable media device with the configuration information obtained from the barcode image thereby enabling the portable media device to connect to the network to access the one or more service providers.

2. The method in accordance with claim 1, wherein capturing the image of a barcode comprises taking a picture of the barcode with a camera, and extracting the configuration information from the barcode image comprises using digital imaging techniques to decode the barcode image.

3. The method in accordance with claim 1, wherein capturing the image of a barcode comprises reproducing the barcode image with a charged-couple device reader, and extracting the configuration information from the barcode image comprises using software to decode the barcode image.

4. The method in accordance with claim 1, wherein capturing the image of a barcode is implemented using a barcode scanner that is built into the media device.

5. The method in accordance with claim 1, wherein capturing the image of a barcode is implemented using an LCD panel display with optical sensors embedded into pixels of the display.

6. The method in accordance with claim 1, wherein the image of the barcode further encodes configuration information for configuring the portable media device to receive services or content from the one or more service providers, and wherein the method further comprises configuring the portable media device with the configuration information to enable the portable media device to receive services or content from the one or more service providers.

7. The method in accordance with claim 6, wherein the configuration information for configuring the portable media device to access the network comprises a DNS address of the network, and wherein the configuration information for configuring the portable media device to receive services or content from the one or more service providers comprises authentication information for authenticating a user to the one or more service providers.

8. The method in accordance with claim 1, wherein the barcode data encodation schema is either 1-dimensional, 2-dimensional, or 3-dimensional.

9. The method in accordance with claim 1, wherein the media device is one of is one of a satellite radio device, a portable audio player, a portable DVD or CD player, a personal computer, a laptop computer, a cellular telephone, a personal digital assistant (PDA), or any combination thereof.

10. A method for generating a barcode that contains configuration information for configuring a portable media device to access one or more service providers, the method comprising:
receiving a request from a computer system for a barcode that contains configuration information for configuring a portable media device to access the services and/or content of a specified service provider, the request including an identification of the portable media device and the service provider to which access is desired from the portable media device;
determining admission requirements that are required by the service provider in order for the portable media device to access the services and/or content offered by the service provider;
determining configuration information necessary to configure the portable media device so that the portable media device complies with the admission requirements of the service provider;
encoding the configuration information into a barcode; and
displaying the barcode to enable the portable media device to scan the barcode such that upon scanning the barcode, the portable media device is configured with the configuration information to thereby enable the portable media device to access content and/or services from the service provider.

11. The method in accordance with claim 10, wherein the service provider is a network provider such that configuration information comprises information for configuring the portable media device to access a network provided by the network provider.

12. The method in accordance with claim 10, wherein the service provider is a media content provider such that the configuration information comprises information for configuring the portable media device to receive content from the media content provider.

13. The method in accordance with claim 10, wherein determining the admission requirements comprises one of:
accessing admission requirements that are stored in a memory; or
accessing admission requirements directly from the service provider.

14. The method as recited in claim 10, wherein the barcode is displayed on the screen of the computer system.

15. The method in accordance with claim 10, wherein the barcode is displayed by printing the barcode on a static medium.

16. The method in accordance with claim 10, wherein the configuration information comprises information for configuring the portable media device to access a network and information for configuring the portable media device to receive content from a media content provider.

17. The method in accordance with claim 10, wherein the method is accomplished through the use of a service center that is external to the media device and the service provider.

18. A portable media device configured to communicate with a wireless network and capable of receiving data in the form of a barcode, the portable media device comprising:
a processor;
means for capturing an image of a barcode; and
memory storing computer executable instructions which when executed by the processor perform the following method:
capturing an image of a barcode that encodes configuration information for configuring the portable media device to connect to a network;
extracting the configuration information from the barcode image; and
configuring the portable media device with the configuration information obtained from the barcode image thereby enabling the portable media device to connect to the network to access the one or more service providers.

19. The portable media device as recited in claim 18, wherein the means for capturing an image is one of:
a camera;
a charge-coupled device reader; or
a barcode scanner.

20. The portable media device as recited in claim 18, wherein the means for capturing an image of a barcode is a LCD panel display with optical sensors embedded into pixels of the display.

21. The portable media device as recited in claim 18, wherein the portable media device is one of a satellite radio device, a portable audio player, a portable DVD or CD player, a personal computer, a laptop computer, a cellular telephone, a personal digital assistant (PDA), or any combination thereof.

* * * * *